United States Patent
Eriksen et al.

(10) Patent No.: US 10,005,111 B2
(45) Date of Patent: Jun. 26, 2018

(54) TURBINE ENGINE CLEANING SYSTEMS AND METHODS

(71) Applicant: General Electric Company, Schenectady, NY (US)

(72) Inventors: Michael Edward Eriksen, Cincinnati, OH (US); Matthew Bos, Cincinnati, OH (US); Nicole Jessica Tibbetts, Delanson, NY (US); Michael Scheper, Fort Wright, KY (US); Eric Zeltwanger, West Chester, OH (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 15/005,096

(22) Filed: Jan. 25, 2016

(65) Prior Publication Data

US 2017/0209904 A1 Jul. 27, 2017

(51) Int. Cl.
| | |
|---|---|
| B08B 9/00 | (2006.01) |
| F01D 5/08 | (2006.01) |
| F01D 5/18 | (2006.01) |
| F01D 25/00 | (2006.01) |
| B08B 7/02 | (2006.01) |
| B24C 3/32 | (2006.01) |

(52) U.S. Cl.
CPC ............ B08B 9/00 (2013.01); F01D 5/081 (2013.01); F01D 5/186 (2013.01); F01D 25/002 (2013.01); B08B 7/02 (2013.01); B24C 3/327 (2013.01); F05D 2220/32 (2013.01); F05D 2230/72 (2013.01); F05D 2270/11 (2013.01); Y02T 50/672 (2013.01); Y02T 50/676 (2013.01)

(58) Field of Classification Search
None
See application file for complete search history.

(56) References Cited

U.S. PATENT DOCUMENTS

| | | | |
|---|---|---|---|
| 3,623,668 | A | 11/1971 | Freid |
| 5,679,174 | A | 10/1997 | Buongiorno |
| 5,758,486 | A | 6/1998 | Fetescu |
| 6,233,937 | B1 | 5/2001 | Gray |
| 6,310,022 | B1 | 10/2001 | Amiran |
| 6,478,033 | B1 | 11/2002 | Foster |

(Continued)

FOREIGN PATENT DOCUMENTS

| | | |
|---|---|---|
| DE | I02008019892 A1 | 10/2009 |
| EP | 2 927 504 A1 | 10/2015 |
| EP | 3 061 923 A1 | 8/2016 |

OTHER PUBLICATIONS

Extended European Search Report and Opinion issued in connection with corresponding EP Application No. 17152919.1 dated Oct. 9, 2017.

*Primary Examiner* — Eric W Golightly
(74) *Attorney, Agent, or Firm* — General Electric Company; Pamela Kachur

(57) ABSTRACT

A system and method of cleaning a turbine engine are provided. The method may include inserting, directing and evacuating a cleaning agent. Inserting may include inserting the cleaning agent through a predefined access port into a cooling cavity defined by an internal wall of an assembled turbine component, while directing may include directing the cleaning agent against the internal wall to remove a foreign material therefrom. Evacuating may include evacuating the cleaning agent from the cooling cavity.

9 Claims, 7 Drawing Sheets

(56) References Cited

U.S. PATENT DOCUMENTS

| | | |
|---|---|---|
| 6,491,048 B1 | 12/2002 | Foster |
| 6,503,334 B2 | 1/2003 | Ruiz et al. |
| 6,585,569 B2 | 7/2003 | Tomlinson |
| 6,883,527 B2 | 4/2005 | Travaly et al. |
| 6,932,093 B2 | 8/2005 | Ogden et al. |
| 7,018,965 B2 | 3/2006 | Yan et al. |
| 7,065,955 B2 | 6/2006 | Reback et al. |
| 7,115,171 B2 | 10/2006 | Powers et al. |
| 7,373,781 B2 | 5/2008 | Reback et al. |
| 7,454,913 B1 | 11/2008 | Tassone et al. |
| 7,531,048 B2 | 5/2009 | Woodcock et al. |
| 8,245,952 B2 | 8/2012 | de la Bruère-Terreault et al. |
| 8,303,243 B2 | 11/2012 | Fish et al. |
| 8,535,449 B2 | 9/2013 | Hughes et al. |
| 8,628,624 B2 | 1/2014 | Turner et al. |
| 8,632,299 B2 | 1/2014 | Eleftheriou et al. |
| 8,834,649 B2 | 9/2014 | Gebhardt et al. |
| 2002/0103093 A1 | 8/2002 | LaGraff et al. |
| 2005/0139235 A1 | 6/2005 | Succop |
| 2009/0084411 A1* | 4/2009 | Woodcock ................ B08B 9/00 134/22.18 |
| 2011/0175350 A1* | 7/2011 | Thompson .............. B64F 1/362 285/405 |
| 2013/0174869 A1 | 7/2013 | Rösing et al. |
| 2013/0192257 A1* | 8/2013 | Horine .................... F01D 11/08 60/796 |
| 2013/0199040 A1 | 8/2013 | Dudeck et al. |
| 2014/0063228 A1 | 3/2014 | Boles et al. |
| 2014/0245558 A1 | 9/2014 | Diaz et al. |

\* cited by examiner

TURBINE ENGINE CLEANING SYSTEMS AND METHODS

FIELD OF THE INVENTION

The present subject matter relates generally to turbine engines, and more particularly, to cleaning systems and methods for a gas turbine engine.

BACKGROUND OF THE INVENTION

Aircraft engines used to propel aircraft through certain routes often experience significant fouling due to heavy environmental particulate matter intake during flight, idling, take-off, and landing. Environmental fouling degrades performance in turbine components of such aircraft engines. For example, one known mechanism for fouling is the increased roughness of turbine components caused by mineral dust ingestion. Specifically, this increased roughness can result from the formation of micropits caused by particle impact. Subsequently, mineral dust particles accumulate in these pits and block cooling passages by forming layers of fouling material therein. High temperatures on surfaces in downstream stages of the turbine result in thermal alteration and solid-state mineral reactions of the accumulated mineral dust particles, which forms a calcia, magnesia, alumina, silica (CMAS) based reaction product. Consequently, water wash treatments, which are frequently used to clean the turbine components, often are not successful in removing the accumulated mineral dust and its secondary reaction products.

This problem can become magnified in the internal portions of a turbine component. Although the internal portions of the components may be susceptible to fouling, they can be virtually impossible to reach while assembled or installed on-wing. Water wash treatments performed on wing are often unable to reach these portions at all. In order to provide cleaning to a turbine component's internal portions, most if not all of the engine must be first disassembled. Moreover, the individual component must be removed from its adjacent elements. The result is often time-consuming and expensive.

Accordingly, further improvements to cleaning methods and systems are desired. Methods and systems that provide cleaning to an internal portion of a turbine component without requiring significant disassembly would be useful.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method of cleaning a turbine engine is provided. The method may include inserting the cleaning agent through a predefined access port into a cooling cavity defined by an internal wall of an assembled turbine component. The method may further include directing the cleaning agent against the internal wall to remove a foreign material therefrom. The method may still further include evacuating the cleaning agent from the cooling cavity.

In accordance with another embodiment of the present disclosure, a method of cleaning a turbine engine is provided. The method may include dispensing a cleaning agent as an agent flow from an external conduit into a cooling cavity defined by an internal wall of an assembled turbine component. The dispensing may include guiding the cleaning agent through a first access port defined through a casing of the engine. The method may further include flushing the cleaning agent through the cooling cavity to remove a foreign material therefrom. The method may still further include draining the cleaning agent from the cooling cavity.

In accordance with yet another embodiment of the present disclosure, a gas turbine engine is provided. The gas turbine engine may include an engine casing defining a radial access port to selectively receive a cleaning agent duct. A turbine component may be provided, including an internal wall defining a cooling cavity in fluid communication with the access port of the engine casing. The internal wall may further define a cooling aperture to direct a fluid flow from the cooling cavity to the hot gas flow path. A port plug may be removably disposed in the access port to selectively prevent fluid communication through the predefined access port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
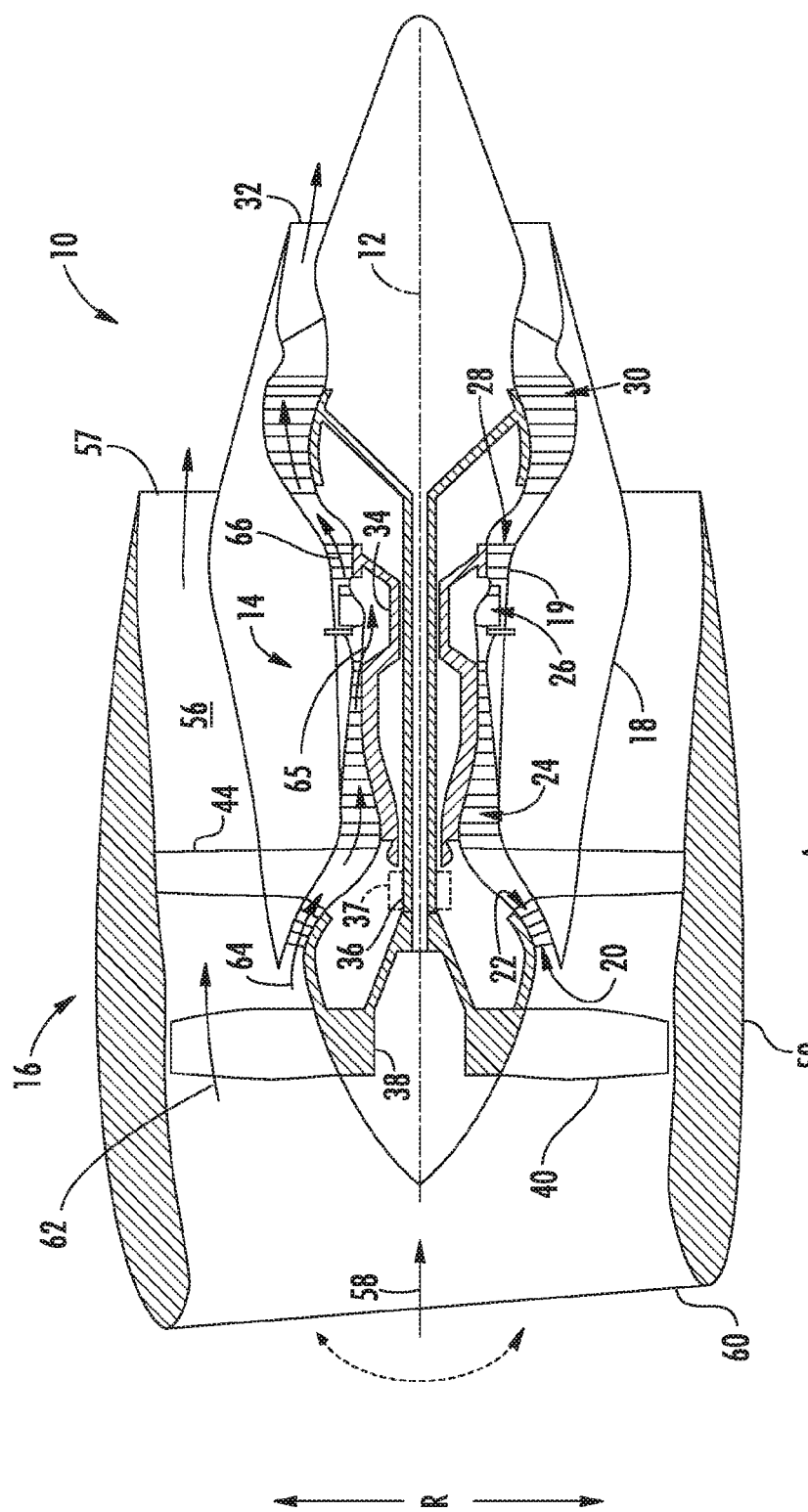
FIG. 1 provides a cross-sectional schematic view of an exemplary gas turbine engine in accordance with one or more embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure provides a system and method for cleaning an internal portion of a gas turbine engine component. Generally, a cleaning agent may be provided directly to the internal portion of the turbine component before exiting the turbine component at, for example, a passage through which cooling air flows.

Exemplary turbine components include, but are not limited to, shrouds, blades, rotors, nozzles, or vanes. Moreover, the components may be fabricated from a metallic material. As used herein, the term "metallic" may refer to a single metal or a metal alloy. Exemplary metallic materials include, but are not limited to, nickel, titanium, aluminum, vanadium, chromium, iron, cobalt, and alloys thereof. Alternatively, turbine components may be fabricated from a non-metallic material, including but not limited to ceramic matrix composites (CMCs), polymer matrix composites (PMCs) as well as other non-metallic materials.

Referring now to the drawings, FIG. 1 is a schematic cross-sectional view of an exemplary high-bypass turbofan type engine 10 herein referred to as "turbofan 10" as may incorporate various embodiments of the present disclosure. Although the engine is shown as a turbofan, it is anticipated that the present disclosure can be equally applicable to other turbine-powered engines, such as an open rotor engine, a turboshaft engine, a turboprop engine, or other suitable engine configurations.

As shown in FIG. 1, the turbofan 10 has a longitudinal or axial centerline axis 12 that extends therethrough for reference purposes. In general, the turbofan 10 may include a gas turbine or core turbine engine 14 disposed downstream from a fan section 16. The core turbine engine 14 may generally include a substantially tubular outer casing 18 that defines an annular inlet 20. The outer casing 18 may be formed from multiple casings or casing segments 19. The outer casing 18 encases, in serial flow relationship, a compressor section having a booster or low pressure (LP) compressor 22, a high pressure (HP) compressor 24, a combustion section or chamber 26, a turbine section including a high pressure (HP) turbine 28, a low pressure (LP) turbine 30, and a jet exhaust nozzle section 32.

A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also be connected to a fan spool or shaft 38 of the fan section 16. In particular embodiments, the LP spool 36 may be connected directly to the fan spool 38 such as in a direct-drive configuration. In alternative configurations, the LP spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

During operation of the turbofan engine 10, a volume of air 58 enters the turbofan 10 through an associated inlet 60 of the nacelle 50 and/or fan section 16. As the volume of air 58 passes across the fan blades 40, a first portion of the air, as indicated by arrows 62, is directed or routed into the bypass airflow passage 56 and a second portion of the air, as indicated by arrow 64, is directed or routed to a hot gas path 65. Specifically, the second portion of air 54 is directed into the LP compressor 22. The pressure of the second portion of air 64 is then increased as it is routed through the HP compressor 24 and into the combustion section 26, where it is mixed with fuel and burned to provide combustion gases 66 to drive the turbines 28 and 30.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 65 for routing the combustion gases 66 through the core turbine engine 16. Upon operation of the engine 10 during certain conditions, one or more foreign materials (e.g., CMAS based materials) may accumulate at various points within the core turbine engine 14.

Figure 2:
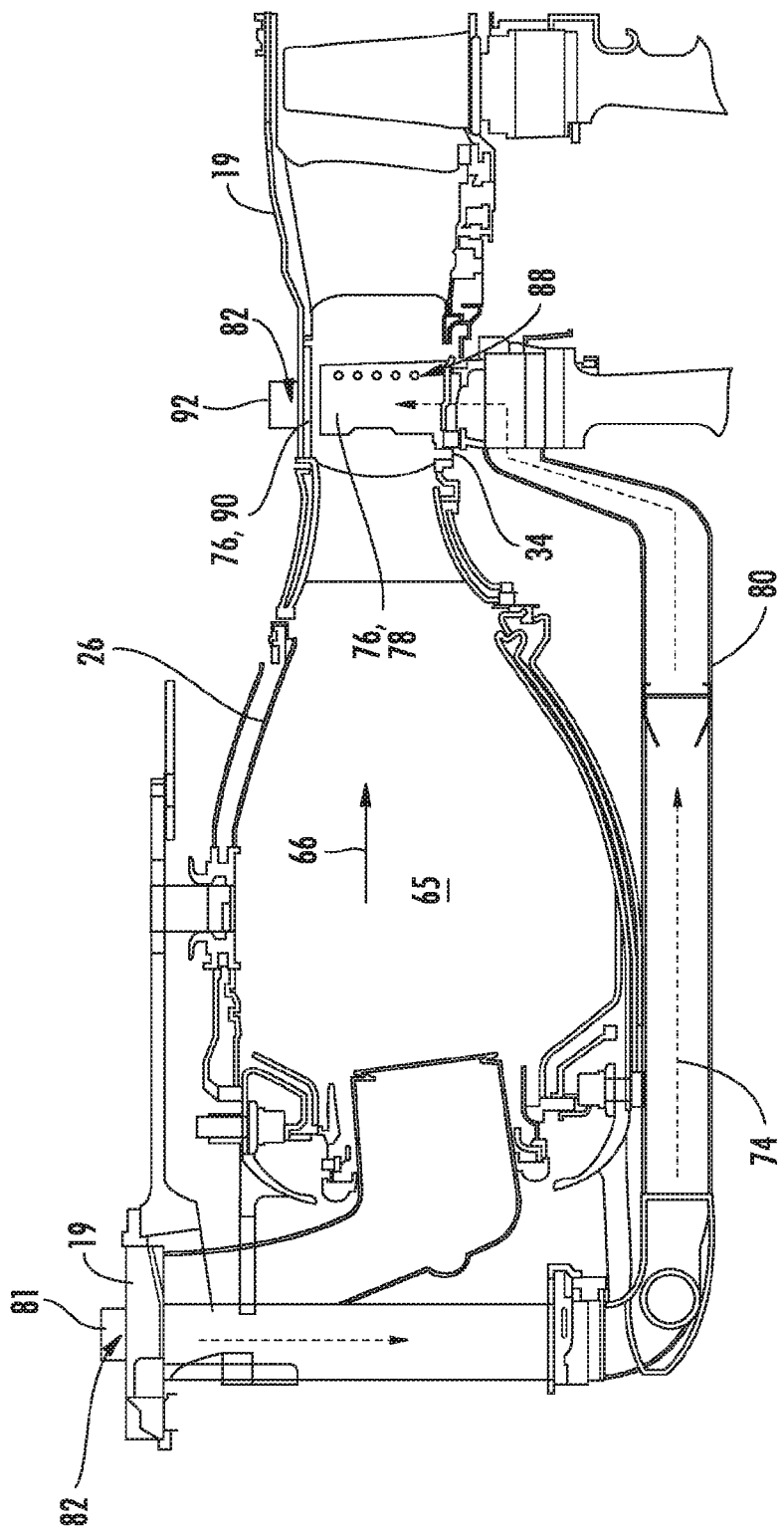
FIG. 2 provides a longitudinal sectional view of a portion of an exemplary gas turbine engine in accordance with one or more embodiments of the present disclosure.
Figure 3:
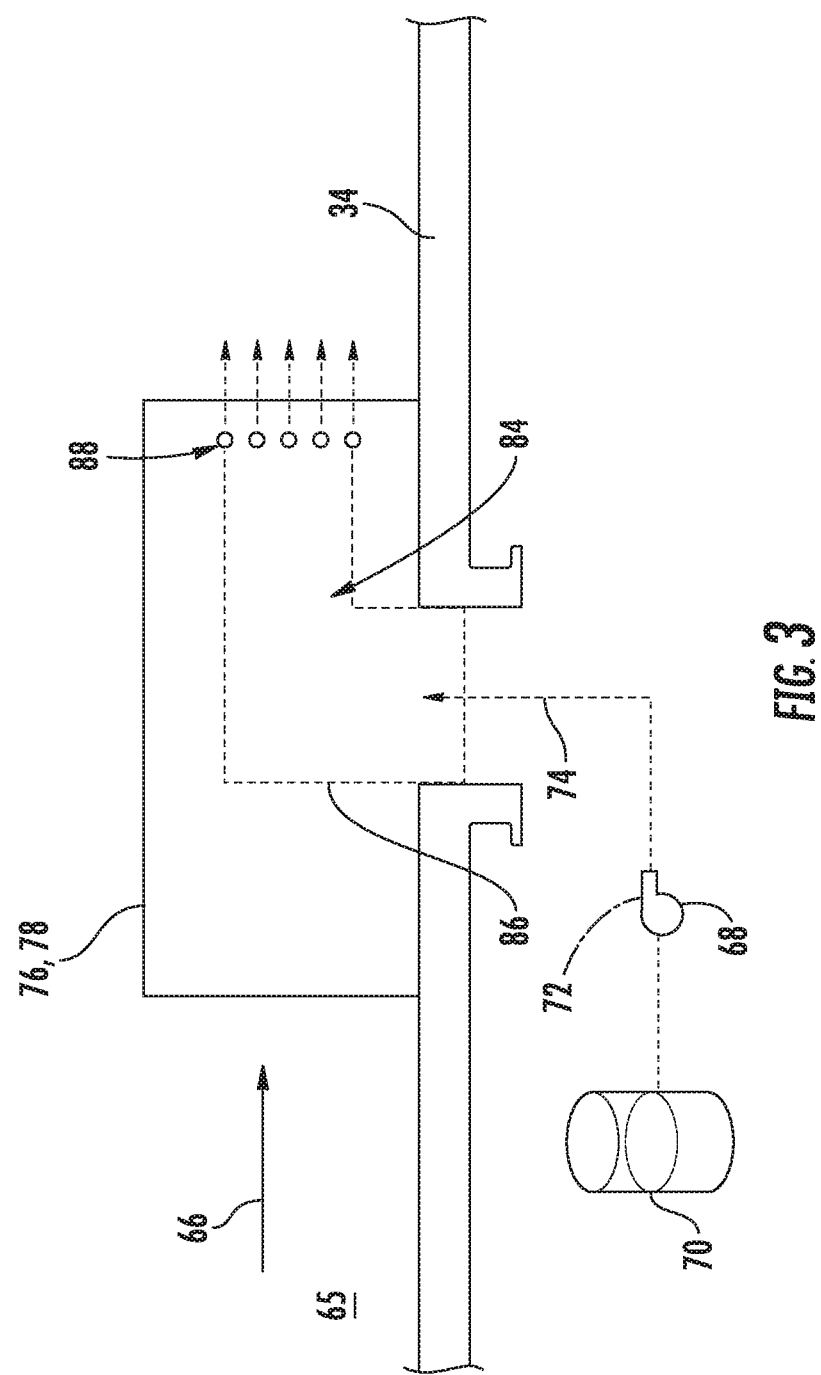
FIG. 3 provides a schematic view of an exemplary turbine component in accordance with one or more embodiments of the present disclosure.

Turning to FIGS. 2 and 3, one or more portion of the core turbine engine 14 may be configured to receive a cleaning agent 74. The cleaning agent 74 may be supplied, for example, from a reservoir 70 by a pump 68 to facilitate removal and/or dissolution of damaging foreign materials. As shown, the pump 68 of some embodiments is configured in selective fluid communication with the reservoir 70. In some embodiments, communication between the engine 10 and pump 68, as well as pump operation (e.g., pump activation, pump speed, and/or pump flow pressure), is controlled by the controller 72, as will be described below.

Generally, the controller 72 may include a discrete processor and memory unit (not pictured). Optionally, the controller 72 may include a full authority digital engine control (FADEC), or another suitable engine control unit. The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally comprise memory element(s) including, but not limited to, computer readable medium (e.g., random access memory (RAM)), computer readable non-volatile medium (e.g., a flash memory, EEPROM, NVRAM or FRAM), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For certain embodiments, the instructions include a software package configured to operate the system to, e.g., execute the exemplary method (200) described below with reference to FIG. 8.

Exemplary embodiments of the cleaning agent 74 will include a fluid (e.g., water, detergent, gel, or steam) to at least partially dissolve the foreign material. Some fluids may be selected based on their ability to dissolve or deteriorate a specific foreign material or type of foreign material (e.g., CMAS based reaction products). In additional or alternative embodiments, the cleaning agent 74 includes a solid particulate, such as dry ice, detergent, or walnut shells. The solid particulates may be configured to flow similar to a fluid when dispersed, but individual particulates may be substantially solid and suitably abrasive to dislodge a specific foreign material or type of foreign material from a turbine component 76. In still further additional or alternative embodiments, a rigid cleaning frame or brush may be included with the cleaning agent 74 for directly engaging or scrubbing the turbine component 76.

As shown in FIGS. 2 and 3, some exemplary embodiments of the turbine component 76 include a turbine airfoil, such as an HP turbine blade 78 assembled and mounted within the core engine 14. However, additional or alternative turbine airfoils may be embodied by a discrete vane or nozzle. In the exemplary embodiment of FIGS. 2 and 3, the HP turbine blade 78 is included as part of the HP turbine 24 (See FIG. 1) disposed on the HP spool 34 in fluid communication with a duct 80. The duct 80 forms a channel that passes through the combustion section 26, but fluidly isolates the inner passage of the duct 80 from the hot gas flow path 65. As a result, the duct 80 is able to direct fluid between the outer casing segment 19 and an internal portion of the turbine blade 78. A predefined access port 82 is defined in the outer casing segment 19 to receive such fluids. Generally, a cooling cavity 84 is defined by one or more internal walls 86 of the turbine component 76. In additional or alternative embodiments, one or more cooling apertures 88 are defined through the internal walls 86 in fluid communication with the hot gas path 65.

During cleaning operations a cleaning agent 74 may be dispensed through the predefined access port 82. The cleaning agent 74 may then travel through the duct 80 before entering the cooling cavity 84 of HP turbine blade 78, as shown in FIG. 3. Within the HP turbine blade 78 the cleaning agent 74 is directed against the internal wall 86. Foreign material disposed thereon may be dislodged and/or at least partially dissolved. In some embodiments, a fluid or solid particulate cleaning agent 74 may be flushed through the cooling cavity 84. Optionally, the cleaning agent 74 may substantially fill the cooling cavity 84 before being evacuated or drained from the HP turbine blade 78. If drained as a fluid, the cleaning agent 74 may pass directly into the hot gas path 65 where it can be evaporated and/or ejected from the core engine 14 (see FIG. 1). In additional or alternative embodiments, flow of the cleaning agent 74 may be reversed, evacuating at least a portion of the cleaning agent 74 through the same access port 82 through which it entered.

In certain embodiments, the duct 80 is further configured to direct a cooling airflow to the HP turbine blade 78 during engine operations. In some such embodiments, a modulated turbine cooling (MTC) valve 81 (see FIG. 2) is selectively disposed in the access port 82 to control cooling airflow therethrough. For instance, the MTC valve 81 may optionally be embodied by the recited check valve of U.S. Pat. No. 6,659,711, or another suitable cooling modulation valve. Before the cleaning agent 74 is dispersed into the duct 80, the MTC valve 81 may be selectively removed, permitting passage of the cleaning agent 74 through an access port 82 configured to receive the MTC valve 81.

Figure 4:
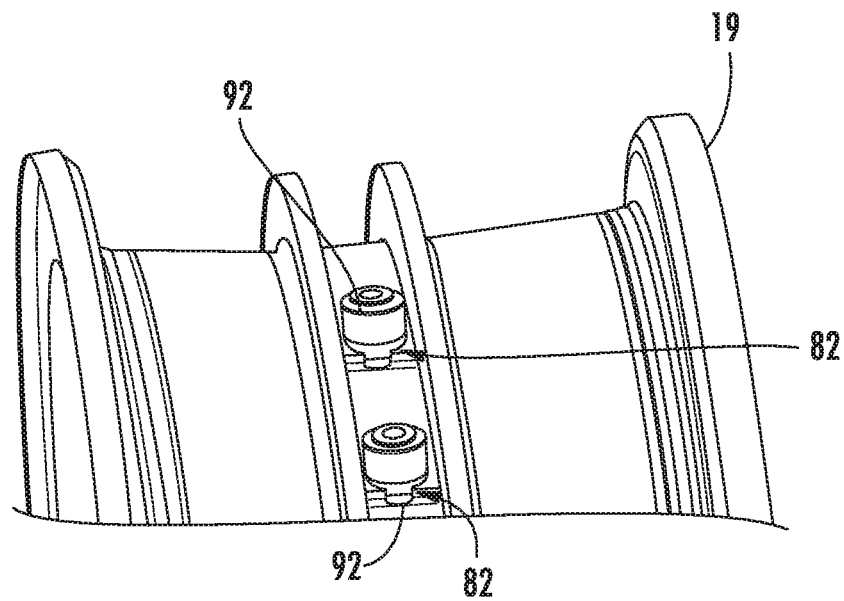
FIG. 4 provides a perspective view of an exemplary turbine casing in accordance with one or more embodiments of the present disclosure.
Figure 5:
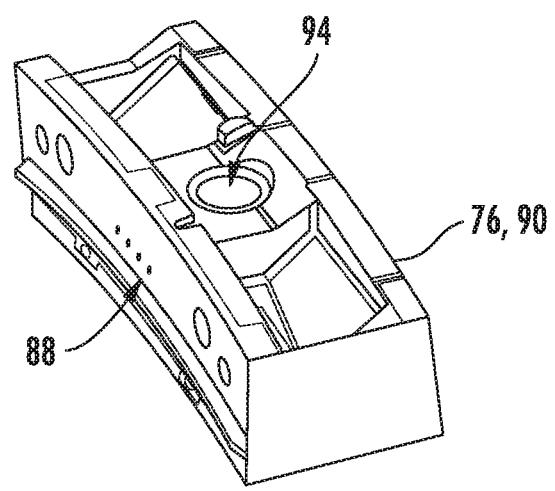
FIG. 5 provides a perspective view of an exemplary turbine shroud in accordance with one or more embodiments of the present disclosure.
Figure 6:
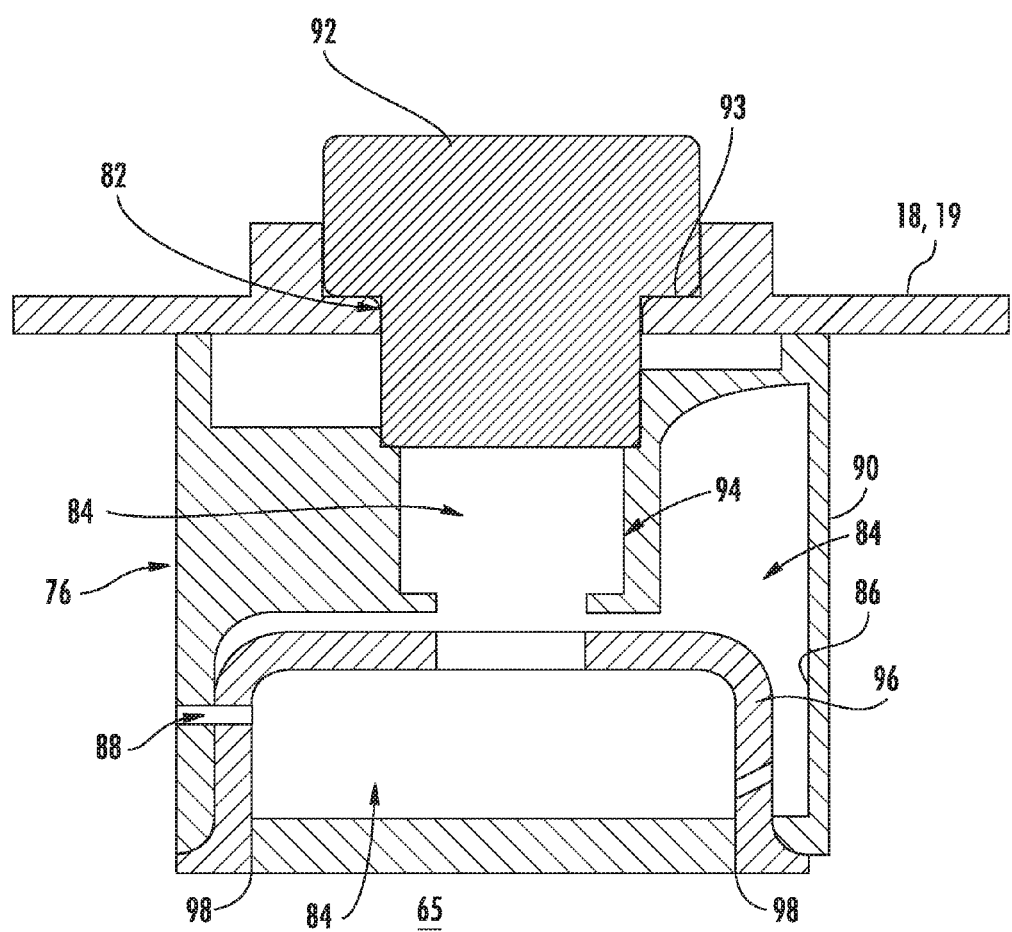
FIG. 6 provides a cross-sectional schematic view of an exemplary turbine component in accordance with one or more embodiments of the present disclosure.

Turning to FIGS. 4 through 7, another exemplary embodiment turbine component 76 is illustrated. Specifically, FIG. 4 illustrates an exemplary outer casing segment 19 configured to enclose a turbine shroud hanger 90 (see FIG. 5). Optionally, the outer casing 18 is further configured to receive one or more port plugs 92. Generally, each port plug 92 corresponds to, and is removably disposed within, a discrete access port 82. As illustrated in FIG. 6, each access port 82 extends radially through the casing 18. Moreover, an annular seat 93 is disposed about the access port 82 to receive the port plug 92. In some embodiments, the port plug 92 is selectively attached to the casing via one or more suitable mechanical fixture (e.g., engagement threads, mated flange, bolt-and-nut, etc.). The port plug 92 may be configured to overlap and fluidly isolate (i.e., substantially prevent the passage of fluid through) the access port 82 when the port plug 92 is disposed within the access port 82. Although the outer casing segment 19 and port plug 92 are illustrated and described with respect to the embodiments of FIGS. 4 through 7, it is understood that they may be similarly applied to any additional or alternative embodiments, such as those shown in FIGS. 2 and 3.

Figure 7:
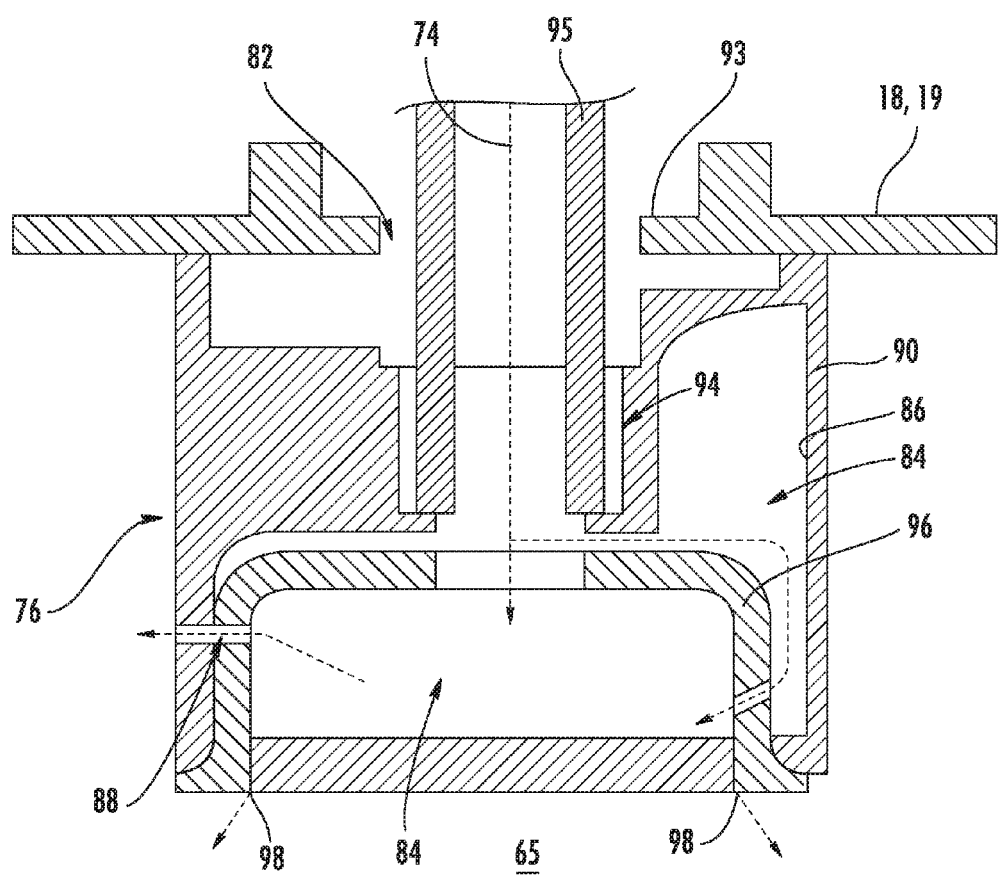
FIG. 7 provides a cross-sectional schematic view of an exemplary turbine component in accordance with one or more embodiments of the present disclosure.

As shown in FIGS. 6 and 7, the shroud hanger 90 of some embodiments is disposed radially inward from the engine casing is further configured to define a mated port 94 along with multiple cooling apertures 88. When assembled, the mated port 94 of the illustrated embodiment may be positioned coaxial with the access port 82 of the engine casing, while the cooling apertures 88 are directed toward and into the hot gas flow path 65. A turbine shroud 96 is received by and fixed to the shroud hanger 90 to define a cooling cavity 84 with the internal walls 86 of the shroud hanger 90. The cooling apertures 88 are defined in fluid communication with the cooling cavity 84. As a result, fluid may readily pass between the hot gas path 65 and the cooling cavity 84. Optional, embodiments of the turbine shroud 96 also define one or more spline seals 98 permitting limited fluid communication between the cooling cavity 84 and the hot gas path 65.

As discussed above, when disposed through the access port 82 and/or mated port 94, the port plug 92 may effectively prevent fluid communication therethrough (see FIG. 6). However, the port plug 92 may also be selectively removed to allow fluid communication between the access port 82 and the cooling cavity 84 (see FIG. 7). In such embodiments, the access port 82 and mated port 94 are, thus, configured to receive a cleaning agent 74. Optionally, the cleaning agent 74 includes a fluid or solid particulate dispensed from an external cleaning agent conduit 95 into the cooling cavity 84. During cleaning operations, the cleaning agent 74 may be flushed through the cooling cavity 84 in direct contact with the internal walls 86. Foreign material may be dissolved or dislodged by contact with the cleaning agent 74. Moreover, during certain cleaning operations, the cleaning agent 74 may substantially fill the volume of the cooling cavity 84.

Once flushed through the cooling cavity 84, the cleaning agent 74 may be evacuated therefrom. In some embodiments, the cleaning agent 74 may be drained from the cooling apertures 88 and/or spline seals 98. The drained fluid may pass directly into the hot gas path 65 where it can be evaporated and/or ejected from the core engine 14 (see FIG.

1). In additional or alternative embodiments, the cleaning agent 74 may enter one access port 82 and evacuate another. In further additional or alternative embodiments, flow of the cleaning agent 74 may be reversed, evacuating at least a portion of the cleaning agent 74 through the same access port 82 through which it entered.

In optional embodiments, the cleaning agent may be flushed repeatedly or pulsed through the cooling cavity. For example, the cooling cavity may be flushed through the cavity and drained, at least partially, before cleaning agent is again flushed through the cavity. In certain embodiments, the delivery of fluid may be provided in waves or pulses corresponding to variances in pumping pressure.

Figure 8:
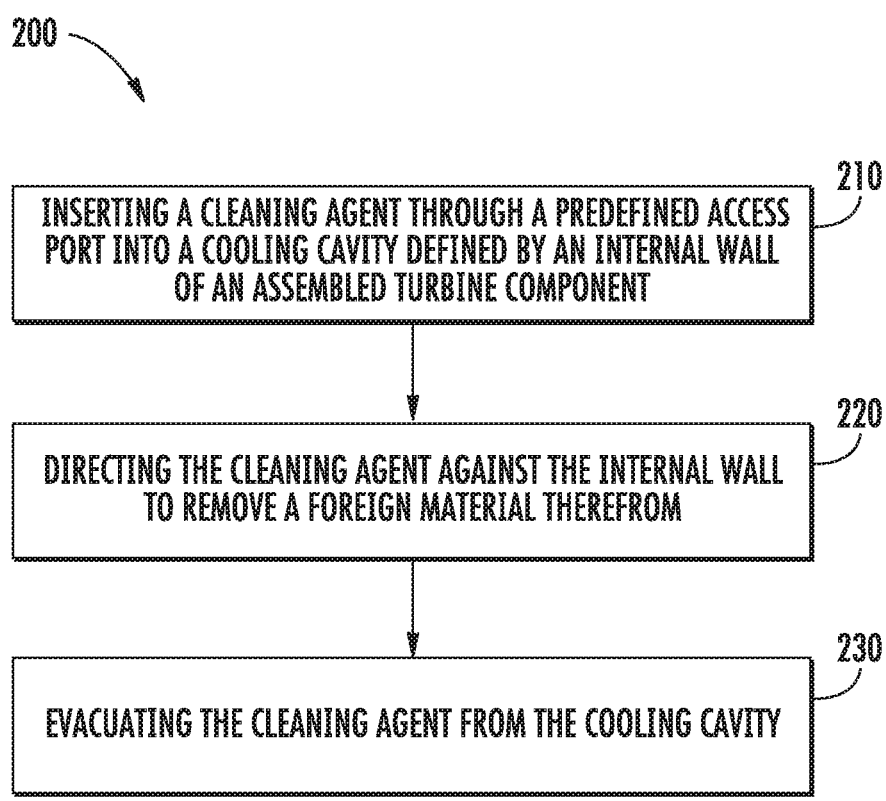
FIG. 8 provides a flow chart illustrating a method of cleaning a turbine engine in accordance with one or more embodiments of the present disclosure.

FIG. 8 depicts a flow diagram of an example method (200) according to example embodiments of the present disclosure. The method (200) can be performed, for instance, by the controller. FIG. 8 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure.

At (210), the method includes inserting a cleaning agent through a predefined access port into a cooling cavity defined by an internal wall of an assembled turbine component. The cleaning agent may include a fluid, solid particulate, or rigid cleaning frame or brush, as described above. For instance, the cleaning agent may include a solid particulate or a fluid for dissolving the foreign material within the cooling cavity. Optionally, the cleaning agent may be dispensed as a cleaning agent flow. In some embodiments, (210) includes guiding the cleaning agent through a first access port defined through a casing of the engine. For instance, a duct may be disposed at least partially through an outer engine casing in fluid communication therewith. In some further embodiments, the cleaning agent may be dispensed through a mated port into a turbine shroud hanger. In additional or alternative embodiments, the cleaning agent may be forced through a channel defined about portion of a combustion chamber before entering an assembled turbine blade. Optionally, (210) may include first removing or withdrawing a plug disposed within the predefined access port.

At (220), the method includes directing the cleaning agent against the internal wall of the cooling cavity. In some embodiments, (220) includes flushing the cleaning agent through the cooling cavity or a volume thereof. Optionally, the flushing may include substantially filling the volume of the cooling cavity. In certain embodiments, the flushing may include pulsating the cleaning agent though the cooling cavity. Upon engaging the foreign material, the cleaning agent may dissolve or dislodge the foreign material, as described above.

Furthermore, at (230), the method (200) includes evacuating the cleaning agent from the cooling cavity. In some embodiments wherein the cleaning agent includes a fluid or solid particulate, the evacuating includes draining the cleaning agent from the cooling cavity. For example, the cleaning agent may be drained through a cooling aperture defined by the turbine component. Additionally or alternatively, the cleaning agent may be directed through a selectively-plugged second access port. In optional embodiments, draining includes reversing the agent flow such that the cleaning agent flows from the cooling cavity back into the external conduit which dispensed the cleaning agent.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of offline cleaning a turbine engine comprising:
    inserting a cleaning agent through a predefined access port into a cooling cavity defined by an internal wall of an assembled turbine component;
    directing the cleaning agent against the internal wall to remove a foreign material therefrom; and
    evacuating the cleaning agent from the cooling cavity;
    wherein evacuating the cleaning agent includes draining the cleaning agent to a gas flow path of the turbine engine from a cooling aperture defined by the turbine component.

2. The method of claim 1, wherein directing the cleaning agent includes flushing the cleaning agent through a volume of the cooling cavity.

3. The method of claim 1, wherein the cleaning agent includes a fluid for dissolving the foreign material.

4. The method of claim 1, wherein the cleaning agent includes a solid particulate.

5. The method of claim 1, wherein inserting a cleaning agent includes guiding the cleaning agent through a duct in fluid communication with an outer engine casing, the outer engine casing enclosing at least a portion of the assembled turbine component.

6. The method of claim 5, wherein guiding the cleaning agent further includes guiding the cleaning agent through a mated port into a turbine shroud hanger.

7. The method of claim 1, wherein inserting a cleaning agent includes withdrawing a plug disposed within the predefined access port.

8. The method of claim 1, wherein inserting a cleaning agent includes forcing the cleaning agent through a channel defined about portion of a combustion chamber into an assembled turbine airfoil.

9. The method of claim 1, wherein the cleaning agent includes a solid particulate.

* * * * *